Figure 1:
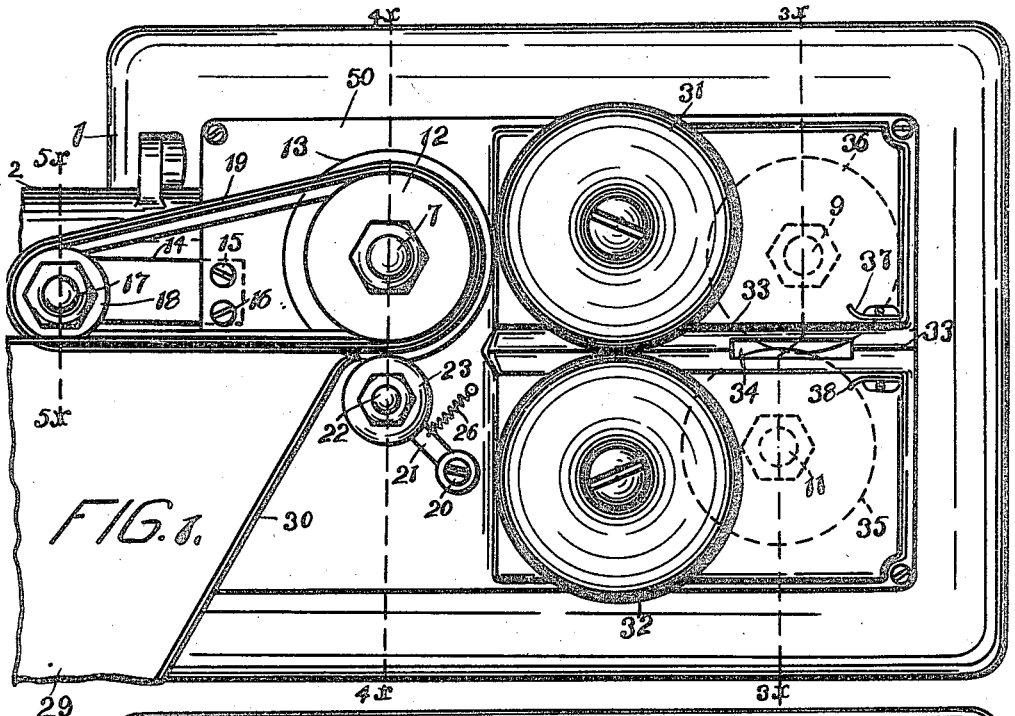

H. D. TAYLOR.
ENVELOP OPENING MACHINE.
APPLICATION FILED DEC. 5, 1912.

1,137,678.

Patented Apr. 27, 1915.

2 SHEETS—SHEET 1.

H. D. TAYLOR.
ENVELOP OPENING MACHINE.
APPLICATION FILED DEC. 5, 1912.
1,137,678.
Patented Apr. 27, 1915.
2 SHEETS—SHEET 2.
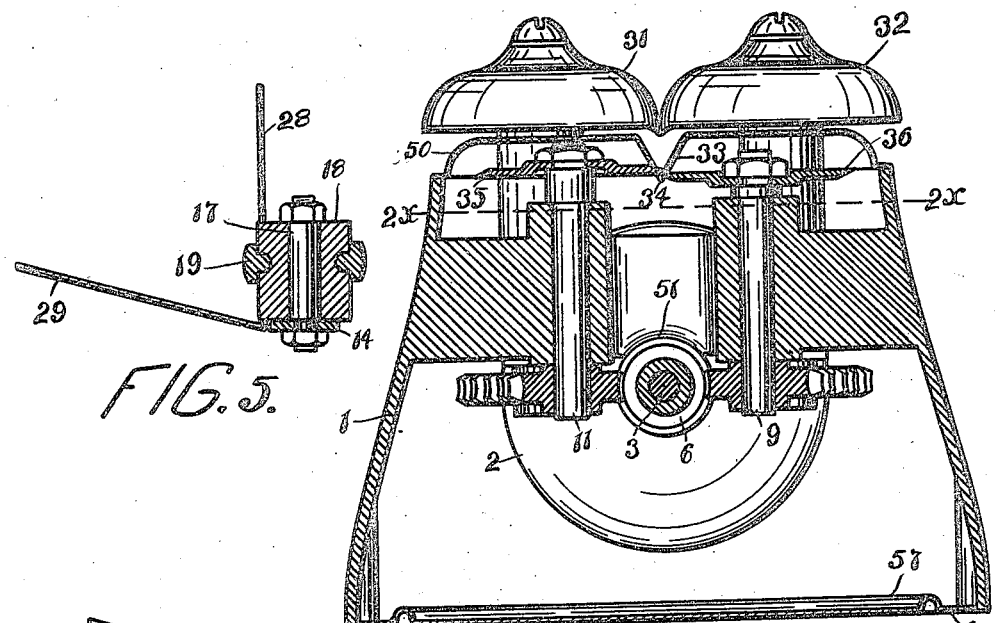
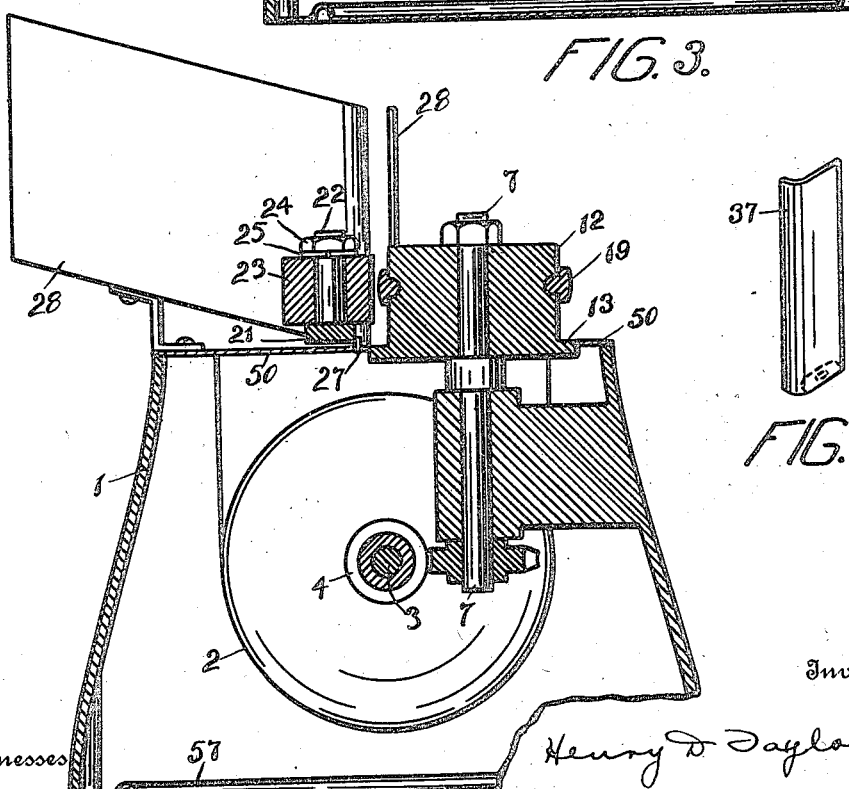

UNITED STATES PATENT OFFICE.

HENRY D. TAYLOR, OF ROCHESTER, NEW YORK, ASSIGNOR TO LIGHTNING LETTER OPENER COMPANY, OF ROCHESTER, NEW YORK, A CORPORATION.

ENVELOP-OPENING MACHINE.

1,137,678.

Specification of Letters Patent.

Patented Apr. 27, 1915.

Application filed December 5, 1912. Serial No. 735,171.

*To all whom it may concern:*

Be it known that I, HENRY D. TAYLOR, a citizen of the United States, residing at Rochester, in the county of Monroe and State of New York, have invented certain new and useful Improvements in Envelop-Opening Machines, of which the following is a specification.

The object of this invention is to provide a machine for opening envelops such as are ordinarily used in mailing letters, the machine being constructed to open the envelop by cutting off a small portion therefrom along any one edge of the envelop.

Another object of my invention is to provide a machine with a special feeding device for moving the envelops forward and sidewise toward the cutters.

Another object of my invention is to provide a pair of rotary cutters specially arranged for cutting the envelop.

These and other objects of my invention will be fully illustrated in the drawings, described in the specification and pointed out in the claims at the end thereof.

Figure 2:
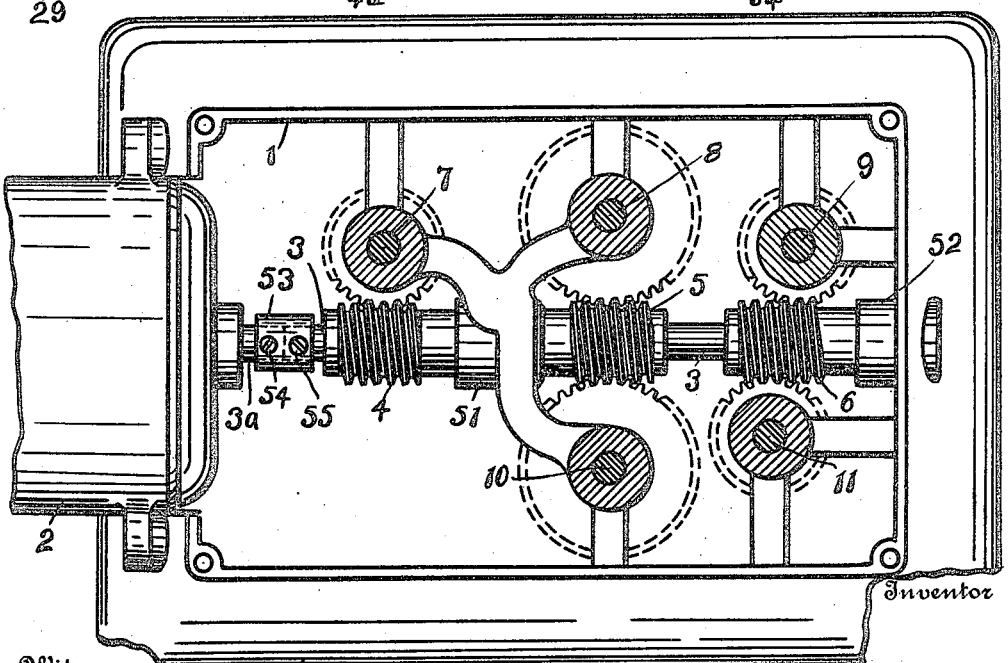

In the accompanying drawings, Figure 1 is a top plan view of my machine. Fig. 2 is a horizontal section of my improved machine, the section being taken on the line $2^x$—$2^x$ in Fig. 3. Fig. 3 is a vertical section of my machine, the section being taken on the line $3^x$—$3^x$ in Fig. 1. Fig. 4 is a vertical section of my improved machine, the section being taken on the line $4^x$—$4^x$ in Fig. 1. Fig. 5 is a sectional detail view of the feeding hopper and belt, the section being taken on the line $5^x$—$5^x$ in Fig. 1. Fig. 6 is a perspective view of one of the guide flanges for holding the latter in line during its travel through the machine.

In the accompanying drawings like reference numerals refer to like parts.

In the drawings reference numeral 1 indicates the casing of the machine, in which casing is mounted an electric motor 2 of any preferred type, such motor being adapted to drive the driving shaft 3 which runs lengthwise of the machine. The shaft 3 is supported by the bearings 51 and 52 and is coupled to the motor shaft $3^a$ by means of the sleeve 53 and the set screws 54 and 55. The bottom of the machine casing 1 is closed by the plate 56 which is attached to the casing in any way, and completely closes the opening therein. A flange 57 is formed therein to inclose a basin which can collect any oil or dirt which drops from the operating parts. On this shaft are suitable worm gears 4, 5 and 6, which gears are adapted to mesh with and drive the various parts that will presently be described.

Mounted to turn upright in the machine are the shafts 7, 8, 9, 10 and 11. The shaft 7 has on the upper end thereof a pulley 12, which pulley has a flange 13 on the lower edge thereof, which flange is adapted to receive the envelop from the bottom of the hopper and support the envelop as it passes from the hopper to the V-shaped trough 33. This flange revolves in a circular opening in the plate 50.

Fastened to the frame 1 is the bracket 14 by the screws 15 and 16. On the outer end of this bracket is a stud 17 on which is adapted to rotate the pulley 18. Around the pulleys 12 and 18 the belt 19 is adapted to travel. This belt is preferably made of rubber and is intended to be tight.

Mounted on the frame 1 is the stud 20 on which in turn is mounted the swinging arm 21 on the outer end of which is carried the stud 22, on which stud is mounted to rotate the idler pulley 23. The pulley 23 is held on the stud 22 by means of the nut 24 and a spring washer 25 is clamped between the nut and the pulley so as to retard the rotation of the pulley. The arm 21 is drawn to the right as shown in Fig. 1 by the spring 26, so as to hold the arm 21 against the pin 27, holding the pulley with a very slight clearance between it and the belt 19. The object of this pulley is to prevent the passing of more than one envelop at a time, sufficient clearance being provided between the pulley and the belt to secure this result. If a second or third envelop attempts to pass simultaneously, the pulley will hold such additional envelops back until the first envelop has completely passed, and the second envelop can then come into contact with the belt, which will cause it to be fed forward.

The driving belt 19 travels along the lower edge of the hopper 28, which hopper has an inclined bottom 29, the envelops being placed vertically in this hopper and feeding by gravity along the hopper until they come into contact with the belt 19.

The forward wall of the hopper is inclined as shown at 30 in Fig. 1. This arrangement secures the arrangement of the letters in step form automatically by the operation of the machine, and the narrow opening between the wall 30 and the belt and the roller 23 both coöperate to prevent the feeding of more than a single letter at a time.

Mounted upon the shafts 8 and 10 are the rubber feed rolls 31 and 32 such as are described in my prior application Serial No. 703,584, filed June 12, 1912, the effect of which feed rolls is to force the envelop down into the V-shaped groove 33 along which the envelop passes to the cutters. This groove is cut away at 34 to receive the cutting edges of the circular knives 35 and 36, which cutting knives are mounted upon the shafts 9 and 11.

As will be noticed in Figs. 1 and 2, the shafts 9 and 11 are not arranged exactly opposite each other but are arranged so that the upper cutter is in advance of the lower cutter. It will also be observed in Fig. 1 that the tip of the cutter 35 is arranged in line with the bottom of the groove 33 while the tip of the cutter 36 extends across the line of the groove. If the cutter 36 were absent the envelop would travel along the groove and would not be turned sidewise by the edge of the cutter 35, while if the cutter 35 were absent the envelop would move along the groove and would be turned aside by the edge of the cutter 36. The envelop is on the side of the cutter 35 and the shaving that is cut from it is on the side of the cutter 36, and this arrangement of the cutters makes it possible for the envelop to travel straight through the machine without being deflected, while the thin shaving which is taken from the envelop by the cutters is turned to one side. It will also be apparent from this arrangement that the meeting edges of the cutters are very slightly out of line with the bottom of the groove, while the parting edges of the cutters are considerably out of line with the bottom of the groove, the parts being so positioned that the meeting edges of the cutters will be almost in line with the perpendicular extended from the center of the cutter 35 to the V-shaped trough 33. By arranging the cutters in this way it is possible for the letter or envelop to pass through without being deflected by the bevel of either of the cutters, the cutting alone being deflected. The cutters may be arranged directly opposite each other if so preferred but I prefer the placing of the cutters as above described on account of the advantages above mentioned.

Beyond the cutters I provide the guide flanges 37 and 38 arranged on either side of the V-shaped trough, which guide flanges hold the letter in an upright position as it shoots out of the machine so that it may be received in a stacking arrangement which may be provided in connection with the machine.

Having thus described my invention, what I claim as new and patentable is as follows:

1. In a machine for opening envelops, the combination with a guide for directing envelops in upright positions, of a cutting mechanism embodying a pair of cutters having their effective portions traveling in the direction of the feed through the machine for operating on the lower edges of the envelops so guided to remove a thin strip from the lower edge of each envelop and feeding mechanism for moving the envelops along the guide.

2. In a machine for opening envelops, the combination with a guide arranged to direct envelops in upright positions, of a cutting mechanism for operating on the lower edges of the envelops, a feeding mechanism for moving the envelops along the guide, a hopper, and mechanism for feeding the envelops in upright positions from the hopper to the first named feeding mechanism.

3. In a machine for opening envelops, the combination with a guide arranged to direct envelops in upright positions, of a cutting mechanism for operating on the lower edges of the envelops movable along the guide, a hopper and devices for feeding the envelops in upright positions from the hopper, along the guide and to the cutting mechanism.

4. In a machine for opening envelops, the combination with a guide arranged to direct envelops, of a pair of rotary cutters having shafts provided with worm wheels, a pair of rotary feeding devices for moving the envelops along the guide to the cutters, said feeding devices having shafts provided with worm wheels, and a shaft having worms thereon coöperating with the worm wheels on the shafts of the cutters and the feeding devices.

5. In a machine for opening envelops, the combination with a guide, of cutting mechanism for operating on envelops movable along the guide, feeding and deflecting devices for moving the envelops against and along the guide, a hopper for the envelops, and mechanism for moving the envelops from the hopper to the feeding and deflecting devices.

6. In a machine for opening envelops, the combination with a guide, of a cutting mechanism for operating on envelops movable along the guide, a feeding mechanism for moving the envelops along the guide, a hopper, and mechanism for feeding the envelops from the hopper to the first mentioned feeding mechanism, the latter operating at a faster rate of speed than the hopper feeding mechanism.

7. In a machine for opening envelops, the combination of a supporting frame, a hopper and feeding belt, a pair of rotary feeding devices and a pair of rotating cutters arranged in line, and a V-shaped trough extending past the pair of feeding devices to the cutters, said devices coöperating to feed envelops in an upright position from the hopper to the cutting devices.

8. In a machine for opening envelops, the combination of a supporting frame, a pair of cutters and a pair of feeding devices mounted to rotate therein, said cutters and said feeding devices being mounted on upright shafts, and a V-shaped groove extending between said feeding devices and said cutters.

9. In a machine for opening envelops, the combination of a supporting frame, a pair of rotary cutters mounted therein, and a device for guiding the edge of an envelop between said rotary cutters, said cutters being mounted on each side of said guiding device, said cutters overlapping each other, one of said cutters being slightly in advance of the other along said guiding device.

10. In a machine for opening envelops, the combination of a supporting frame, a pair of rotary cutters mounted therein, and a device for guiding the edge of an envelop between said rotary cutters, said cutters being mounted on each side of said guiding device, said cutters overlapping each other, and the line connecting the centers of said cutters being slightly diagonal to said guiding device.

11. In a machine for opening envelops, the combination of a guiding device having a center line, and a pair of circular cutters arranged one on each side of said guiding device, one of said cutters having its periphery substantially in line with the center line of said guiding device, the other of said cutters overlapping said first cutter and having its periphery extending beyond the center line, the meeting edges of said cutters being in line with said center line and the parting edges of said cutters being to one side of the center line.

12. In a machine for opening envelops, the combination of a guiding device having a center line, and a pair of circular cutters arranged one on each side of said guiding device, one of said cutters having its periphery substantially in line with the center line of said guiding device, the other of said cutters overlapping said first cutter and having its periphery extending beyond the center line, and the centers of said cutters being on a line diagonal to the center line of said guiding device.

13. In a machine for opening envelops, the combination of a guiding device having a center line, and a pair of circular cutters arranged one on each side of said guiding device, one of said cutters having its periphery substantially in line with the center line of said guiding device, the other of said cutters overlapping said first cutter and having its periphery extending beyond the center line, and the centers of said cutters being on a line diagonal to the center line of said guiding device, whereby the meeting edges of said cutters are substantially on a line with the center line of said guiding device, and the parting edges of said cutters are at one side of the center line of said guiding device.

14. In a machine for opening envelops, the combination of a supporting frame, a V-shaped guiding device on said frame, a pair of rotary cutters mounted on said frame, and one on each side of said guiding device and extending across the center line of said guiding device, said guiding device being cut away to receive said cutters.

15. In a machine for opening envelops, the combination of a supporting frame, a V-shaped guiding device on said frame, a pair of rotary cutters mounted on said frame, one on each side of said guiding device and extending across the center line of said guiding device, said guiding device being cut away to receive said cutters, and a pair of guide flanges extending up from said guide at the end thereof.

In testimony whereof I affix my signature in presence of two witnesses.

HENRY D. TAYLOR.

Witnesses:
  LENA M. ASH,
  ALICE M. JOHANNS.